United States Patent

[11] 3,627,268

[72] Inventor Mac Gordon Wills
R.R. #2, Chelmsford, Ontario, Canada
[21] Appl. No. 31,588
[22] Filed Apr. 24, 1970
[45] Patented Dec. 14, 1971

[54] FLUID-OPERATED JACK
11 Claims, 4 Drawing Figs.
[52] U.S. Cl............................................................ 254/86 H
[51] Int. Cl............................................................. B60s 9/02
[50] Field of Search............................................. 254/86 R, 86 H; 212/145

[56] References Cited
UNITED STATES PATENTS
2,961,102 11/1960 Pitman........................... 212/145 X
3,549,125 12/1970 Hamilton........................ 254/867

Primary Examiner—Andrew R. Juhasz
Assistant Examiner—David R. Melton
Attorney—Cecil C. Kent ABSTRACT: A fluid-operated jack particularly suited for use as an outrigger on a rock-drilling vehicle includes first and second telescopic guide members. The second guide member has a ground-engaging plate terminally and rigidly secured thereto and a hydraulic ram has a cylinder pivotally connected to the first guide member and a piston rod terminally and pivotally connected to the ground-engaging plate so that the piston rod is disposed essentially parallel to a common axis of the first and second guide members. The guide members usefully have noncircular cross-sectional configurations so that the torsional and transverse stresses applied to the piston rod are significantly reduced so permitting the use of lighter weight cylinders and pistons for a given application.

PATENTED DEC 14 1971

3,627,268

INVENTOR:
MAC GORDON WILLS

BY:

*Cecil C. Kent*
ATTORNEY

INVENTOR:
MAC GORDON WILLS
BY:
Cecil C. Kent
ATTORNEY

FLUID-OPERATED JACK

BACKGROUND OF THE INVENTION

The present invention relates broadly to fluid-operated jacks and more particularly to fluid-operated jacks especially suited for use as outrigger or stabilizing legs on vehicles or other structures on which such outriggers are conventionally provided.

The use of hydraulically operated outriggers or stabilizing legs on mining equipment and vehicles, earthmoving vehicles, forestry vehicles and the like is well known and it is also known that such hydraulic devices are subject to very great stresses during use. Outriggers heretofore known usually include a thrust plate or ground-engaging plate connected to the end of a piston rod extending from within a hydraulic cylinder and, in order to avoid premature failure of such piston rods, it has been necessary to construct such hydraulic cylinders and piston rods in a relatively heavy and rugged manner. In view of the high degree of precision required in the manufacture of such hydraulic components, the cost of such outriggers has been relatively high. Consequently, operational failure of such a component is a serious and expensive matter.

It is a principal object of the present invention to provide a fluid-operated jack and particularly a hydraulic jack which is suitable for use as an outrigger or stabilizing leg and which is characterized by involving significantly less cost for a given use than a hydraulic jack as heretofore known.

Another object of this invention is to provide a fluid-operated jack including a fluid-operated ram and in which the accurately machined components of such a fluid-operated ram are, in use, subjected to smaller stresses than is the case with the jacks heretofore known.

Yet another object of this invention is to provide a fluid-operated jack in which the sizes and consequently the cost of the accurately machined hydraulic components thereof can be significantly reduced.

Other objects of the invention will become apparent as the description herein proceeds.

SUMMARY OF THE INVENTION

In its broadest scope, the present invention provides a fluid-operated jack which comprises axially telescopically cooperating first and second guide members coaxially disposed about a common axis for relative axial reciprocating movement therealong, a thrust plate terminally and rigidly secured to said second guide member for conjoint movement therewith relative to said first guide members, and a double-acting fluid-operated ram pivotally connected to both said thrust plate and said first guide member, which ram includes a cylinder and a piston rod operative for relative reciprocating movement in a direction generally parallel to said common axis of said first and second guide members for causing relative movement of said first and second guide members along said common axis.

Although the fluid-operated jacks of this invention will find application in numerous circumstances, they have proven to be particularly suited for use on mining vehicles on which rock drill guiding and supporting structures are mounted. A specific construction for such a vehicle will be described hereinafter in greater detail.

It is also to be noted that, in addition to providing novel fluid-operated jacks as hereinbefore defined, the present invention also specifically embraces a vehicle which includes a chassis structure and at least one outrigger secured to said chassis structure and which outrigger in turn comprises a first guide member secured to said chassis structure of said vehicle, a second guide member coaxially disposed relative to said first guide member for cooperating axial telescopic movement relative thereto along a common axis of said first and second guide members, a ground-engaging thrust plate terminally and rigidly secured to said second guide member at a lower end thereof for joint movement therewith, a double-acting fluid-operated ram pivotally connected to both said thrust plate and said first guide member, which ram includes a cylinder and a piston rod operative for relative reciprocating movement in a direction generally parallel to said common axis of said first and second guide members, and means for the supply and discharge of operating fluid to and from said cylinder for selectively causing extension and retraction of said piston rod from within said cylinder.

With the foregoing in view, and such other or further purposes, advantages or novel features as may become apparent from consideration of this disclosure and specification, the present invention consists of the inventive concept which is comprised, embodied, embraced or included in the method, process, construction, composition, arrangement or combination of parts, or new use of any of the foregoing, herein exemplified in one or more specific embodiments of such concept, reference being had to the accompanying drawings in which.

DESCRIPTION OF THE PREFERRED EMBODIMENT

Figure 1:
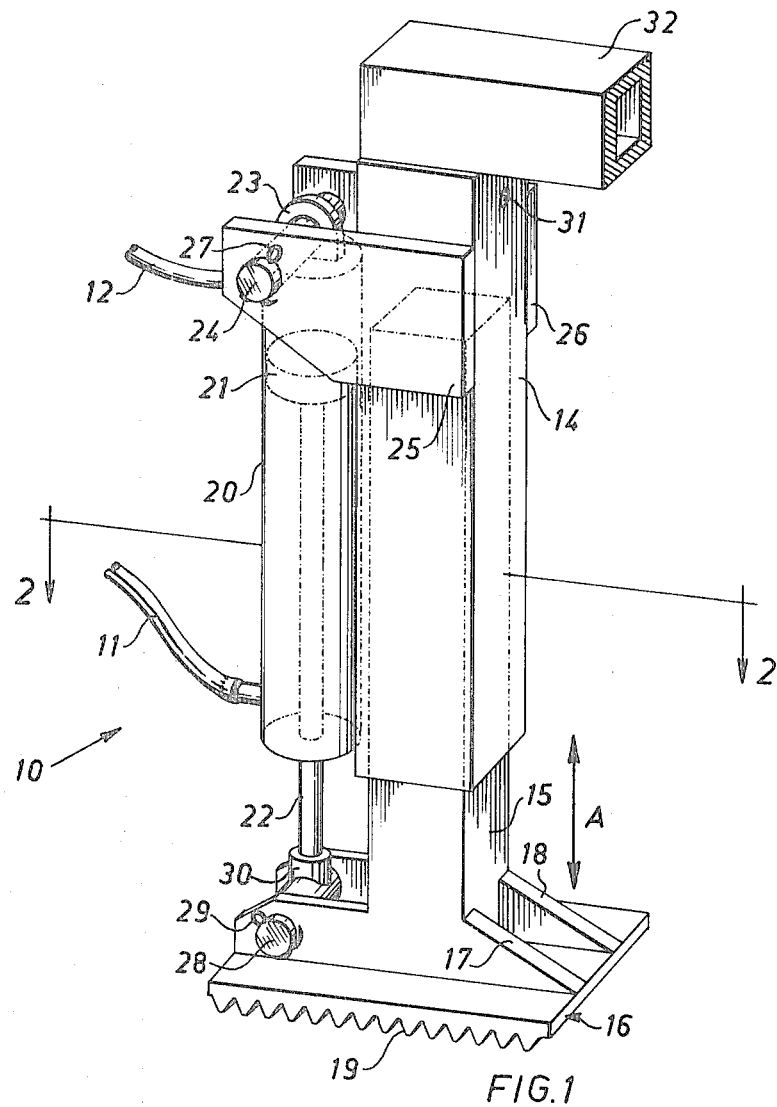
FIG. 1 is a perspective view with certain internal components shown in phantom outline of one particularly useful embodiment of a fluid-operated jack in accordance with the present invention.

Referring first to FIG. 1, it will be noted that one particularly useful embodiment of a fluid-operated jack in accordance with the present invention is indicated in that Figure of the drawings by the legend 10. The jack 10 is designed to be operated by hydraulic fluid supplied to and discharged form the jack 10 through hoses 11 and 12 in a manner which will be explained hereinafter in greater detail.

Figure 2:
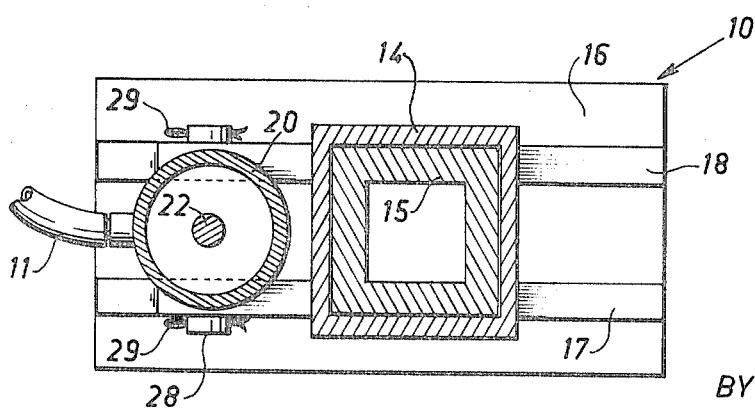
FIG. 2 is a horizontal sectional view through the fluid-operated jack of FIG. 1 when viewed as indicated by the arrows 2—2 of that Figure.

Referring now in greater detail to the structure of the jack 10 per se, it will be seen from FIGS. 1 and 2 that the jack 10 comprises a first or upper guide member 14 in the form of an elongated hollow member having a generally square cross-sectional configuration and an open lower end. A second or lower guide member 15 having an external configuration corresponding to the internal configuration of the upper guide member 14 is slidably received within that upper guide member 14 for axial reciprocating movement therein as indicated by the double-headed arrow A (FIG. 1). The purpose of the guide members 14 and 15 will become more apparent as the description herein proceeds.

At its lower end, the lower guide member 15 is rigidly secured, for example, by welding, to a thrust plate or ground-engaging plate generally indicated at 16. For this purpose, the plate 16 is provided with transversely spaced-apart, upstanding flanges 17 and 18 to which the lower guide member 15 is secured. In accordance with a useful but optional feature of this invention, the plate 16 is formed with an irregular ground-engaging undersurface 19. In the particular embodiment illustrated in FIG. 1, such undersurface is shown as being provided with transversely extending ribs but the use of other patterns of ribs is equally within the scope of this invention.

The jack 10 also includes a hydraulically operated double-acting ram which in turn comprises a cylinder 20 and a piston 21 having a piston rod 22 extending downwardly therefrom.

At its upper end, the cylinder 20 has secured thereto an upstanding lug 23 through which a pivot pin 24 freely extends. The pivot pin 24 is supported in plates 25 and 26 suitably secured, for example, by welding, to opposite faces of the upper guide member 14, split pins 27 serving to retain the pivot pin 24 in position.

At its lower end, the aforementioned piston rod 22 is pivotally connected to the aforementioned ground-engaging plate 16 by means of a pivot pin 28 pivotally extending through holes provided for this purpose in the aforementioned upstanding flanges 17 and 18, split pins 29 being provided to retain this pivot pin 28 in position. The pivot pin 28 is provided with an upstanding radial sleeve adapter 30 within which the lower end of the piston rod 22 is secured, for example, by welding.

It will be seen from FIGS. 1 and 2 that the piston rod 22 is disposed essentially parallel to the common axis of the upper and lower guide members 14 and 15 respectively.

The upper and lower ends of the cylinder 20 are closed and a suitable seal (not shown) of any conventional type is provided for preventing excessive escape of hydraulic fluid from within the cylinder 20 through the lower end thereof around the piston rod 22.

The aforementioned hoses 11 and 12 serve selectively to supply hydraulic fluid under pressure to a desired end of the cylinder 20 and to discharge said fluid from the other end of that cylinder to cause extension and retraction as required of the piston rod 22, and consequently movement of the ground-engaging plate 16.

During such operation of the cylinder 20, into engagement of the upper and lower guide members 14 and 15 respectively serve substantially to reduce the transverse and torsional stresses imposed on the piston rod 22. Consequently, much longer life for the ram structure comprising the cylinder 20, the piston 21 and the piston rod 22 is obtained. Additionally, the present invention permits the use of somewhat smaller ram components in a fluid-operated jack.

Although the invention has hereinbefore been described with reference to the use of guide members 14 and 15 having generally square cross-sectional configurations, it will be understood that the invention is in no way restricted to the use of such particular configurations. It is, for example, equally possible to utilize guide members having rectangular or other polygonal cross-sectional configurations. The use of guide members of circular cross-sectional configurations is also within the scope of this invention but such a construction would be contraindicated for applications in which it is necessary or desired substantially to reduce the torsional stresses applied to the ram structure. Furthermore, it is possible, in accordance with this invention, to construct a fluid-operated jack comprising more than one fluid-operated ram and/or more than one pair of cooperating guide members.

The primary advantages of greater strength and reduced cost in a fluid-operated jack in accordance with the present invention are obtained as a result of the fact that the guide members, such as the guide members 14 and 15 of the jack 10 of FIGS. 1 and 2, do not need to be manufactured to the same degree of precision as would be required for the alternative and conventional use of larger and stronger ram structures.

In the event that the external dimensions of the lower guide member 15 and the internal dimensions of the upper guide member 14 are such as significantly to hinder the free relative movement of such guide members, it will generally be desirable to provide a suitable opening for the free flow of air into and out of the upper guide member 14. Such airflow may occur through an open upper end of the upper guidemember 14 or, if such upper end is closed as shown in FIG. 1, an airflow opening 31 may be provided for this purpose through the wall of the upper guide member 14. In this particular case, the "air cushion" within the upper guide member 14 may, if desired, be utilized to provide some degree of "damping" during operation of the jack.

Although the lower guidemember 15 of the jack 10 is shown in FIG. 1 as being telescopically received within the upper guide member 14, it is equally within the scope of this invention to have such an upper guide member telescopically received within such a lower guide member. Additionally, although reference has hereinbefore been made to the use of jacks intended for engagement with the ground, it will be understood that the jacks of this invention can be utilized for operation in horizontal or other positions.

The jacks of this invention may be mounted on vehicles or other structures in any appropriate manner and, merely by way of illustration, the jack 10 is shown in FIG. 1 as having the upper end of the upper guide member 14 secured, for example, by welding, to a transverse member 32 which in turn is appropriately secured to the vehicle or other structure on which the jack is to be mounted.

A typical use for the fluid-operated jacks of this invention will now be described with reference to FIGS. 3 and 4 of the accompanying drawings in which there is illustrated generally at 40 a wheeled vehicle fitted with three such hydraulic jacks. The vehicle 40 is adapted to support a pair of rock drill guiding and supporting structures 41 and 42 on which in turn rock drills such as a rock drill generally indicated at 41 may be detachably mounted. Such a vehicle is particularly intended for use in cut-and-fill stopping operations.

The vehicle 40 has a tubular frame structure including a longitudinally extending tubular member 44 and a front upstanding frame formed from upright tubular members 45 and 46 and upper and lower, tubular transverse members 47 and 48 respectively. The vehicle 40 is support on front wheels 49 and 50, each of which is mounted an an axle 51 suitably journaled in a transversely outward extension 52 of the lower end of a respective one of the upright frame members 45 and 46.

A steerable rear wheel 53 is journaled on an axle 54 secured to the lower end of a wheel yoke 55 which in turn is pivotally mounted at its upper end about a generally vertical pivot pin 56. A U-shaped handle 57 is provided for steering the vehicle 40, the handle 57 being connected to the yoke 55 in any appropriate manner. The rear wheel assembly hereinbefore described has been omitted from FIG. 4 for the sake of clarity.

Figure 3:
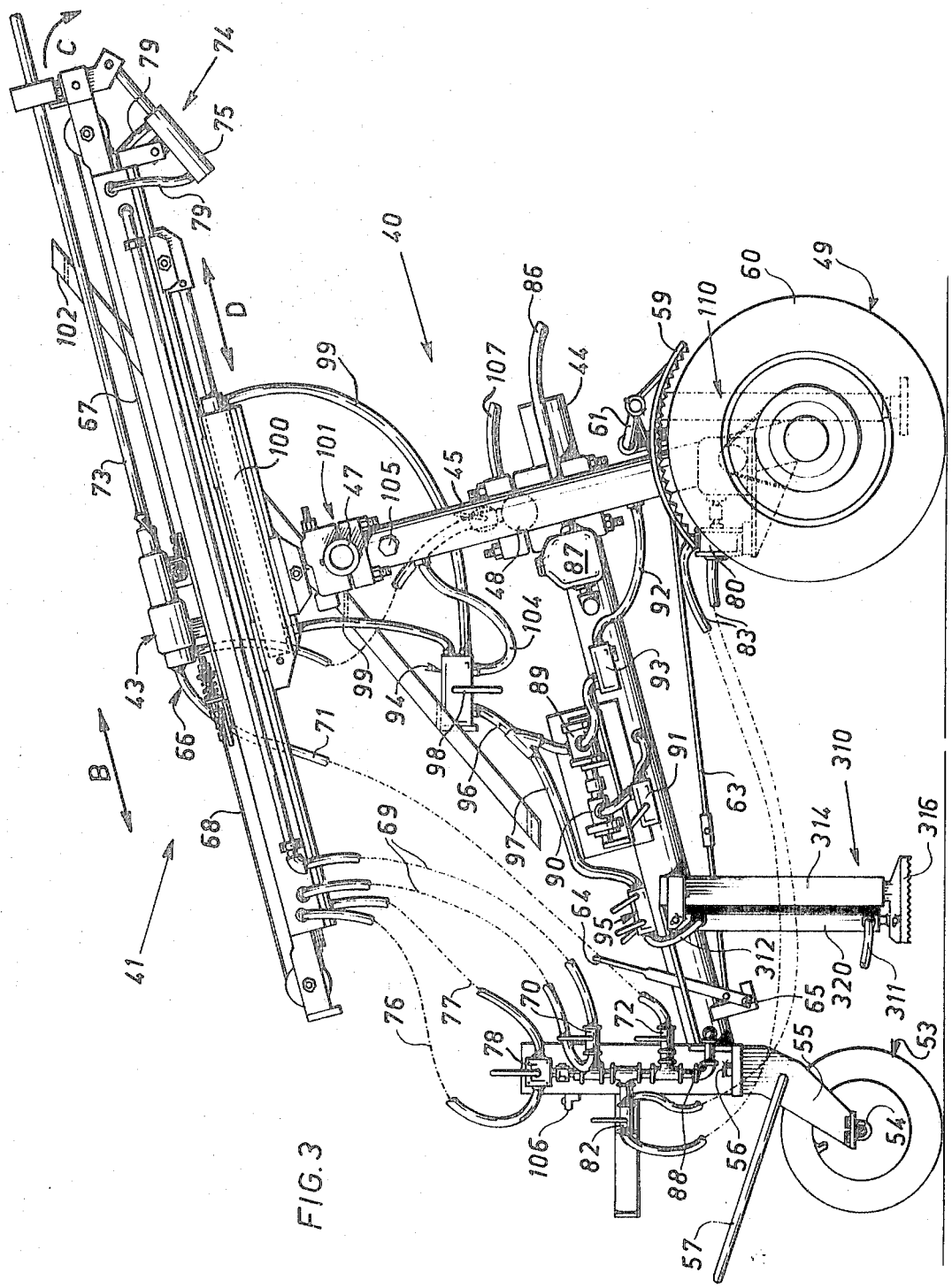
FIG. 3 is a side elevation of a wheeled vehicle provided with drill guiding and supporting structures with a rock drill mounted thereon, and fitted with three fluid-operated jacks (two of which can be seen in FIG. 3) in accordance with the invention, certain component parts of the vehicle having been omitted or being shown in phantom outline for the sake of clarity.
Figure 4:
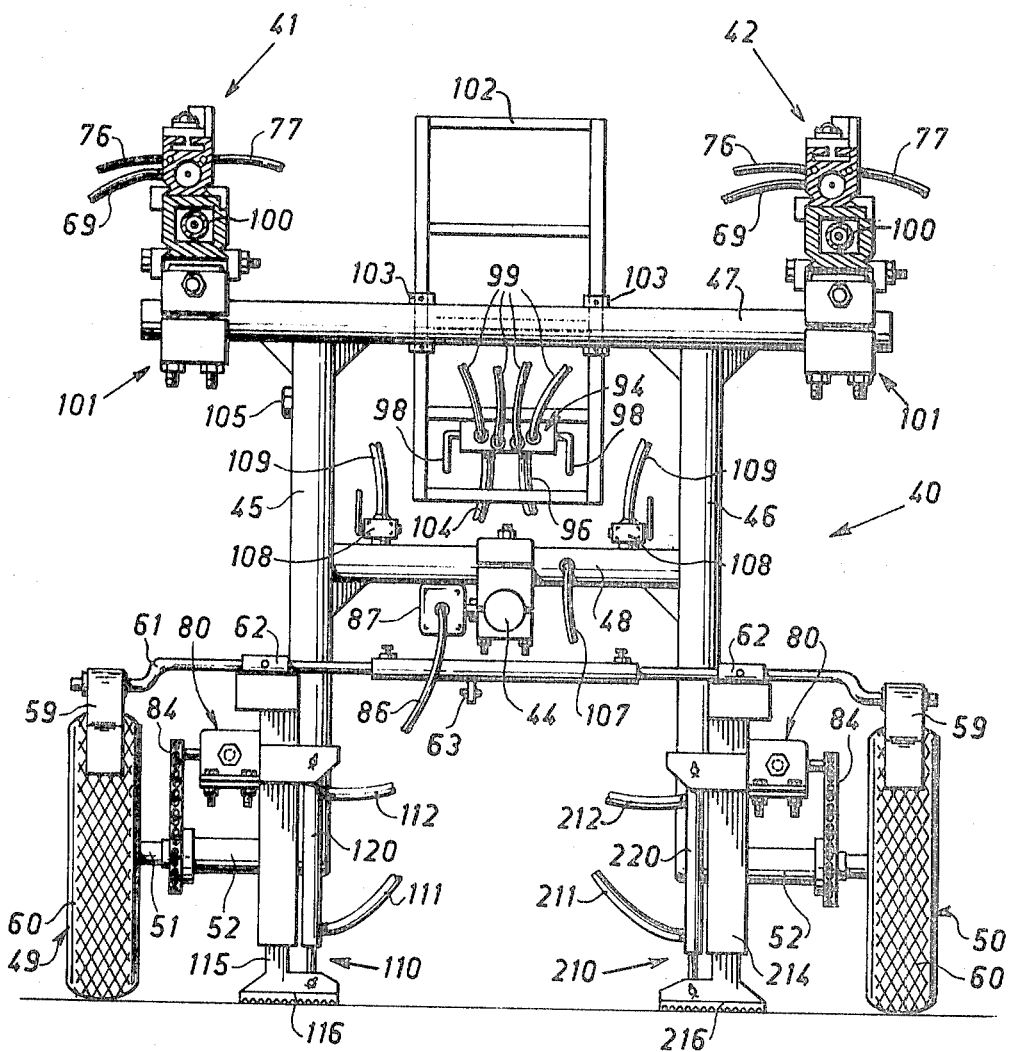
FIG. 4 is a front-end elevation of the vehicle of FIG. 3 showing in greater detail the manner in which two of the fluid-operated jacks of the invention are disposed on the vehicle, the rock drill and certain components of the vehicle having been omitted for the sake of clarity, and the drill guiding and supporting structures provided on the vehicle being shown partly in section.

The particular vehicle 40 shown in FIGS. 3 and 4 is also provided with brake means and, in the particular construction illustrated, such brake means comprise mudguards 59 having ribbed undersurfaces for engagement with the peripheral surfaces of tires 60 on the front wheels 49 and 50. Such mudguard/brakes are supported on double crank arm 61 pivotally mounted at 62 on the vehicle 40 and adapted to be rotated between braking and released positions on rearward/forward movement of a brake linkage 63, such movement being effected in turn by movement of a hand lever 64 pivotally mounted at 65 on the longitudinally extending tubular member 44, suitable detent means (not shown) being provided for holding the hand lever 64 in its braking position.

The aforementioned drill guiding and supporting structures 41 and 42 each comprises a drill-supporting carriage, one of which is generally indicated at 66 in FIG. 3 of the accompanying drawings and on which a rock drill such as rock drill 43 can be detachably mounted. A double-acting pneumatic ram within each of the drill guiding and supporting structures 41 and 42 serves, on operation, to move such a carriage 66 forwardly or rearwardly as indicated by the double-headed arrow B, motion being transmitted to such carriage from a piston-head (not shown) by cables 67 and 68. Airhoses 69 controlled by a valve 70 are provided for the supply and discharge of air to and from each of the drill guiding and supporting structures 41 and 42. An air hose 71 controlled by a valve 72 serves to supply compressed air to the pneumatically operated rock drill 43 for effecting operation of that drill.

A hollow drill steel 73 extends forwardly from the drill 43 through a retractable drill steel centering device generally indicated in FIG. 3 at 74. The centering device 74 can be pivoted forwardly and downwardly as indicated by the arrow C in FIG. 3 by means of a double-acting pneumatic cylinder 75 out of its drill steel supporting position as actually shown in FIG. 3 for the purpose of reducing wear on such centering device 74 on movement of the drill steel 73 once a drill hole has been initiated and after which time further support for such drill steel 73 is no longer required. The supply and discharge of air to and from the cylinder 75 is effected through hoses 76 and 77 under the control of a valve 78, the hoses 76 and 77 being in gaseous communication with respective ones of hoses 79 extending from the cylinder 75 through suitable longitudinal bores provided for this purpose in the drill guiding and supporting structure 41.

The vehicle 40 shown in FIGS. 3 and 4 of the accompanying drawings is provided at each of its wheels 49 and 50 with an air-operated motor 80. Operation of the motor 80 is controlled by valves 82, one of which is visible in FIG. 3 and which are connected to the motor 80 by hoses 83. Drive power is transmitted from the motor 80 to the wheels 49 and 50 through chain-and-sprocket arrangements generally indicated at 84 in FIG. 4.

In the particular vehicle 40 shown in FIGS. 3 and 4 of the accompanying drawings, the aforementioned longitudinally extending tubular member 44 is utilized as a reservoir for compressed air and, for this purpose, this member 44 is supplied with air under pressure from a suitable compressor (not shown) through a hose 86, a lubricator 87 being mounted on the tubular member 44 for the purpose of introducing a suitable liquid lubricant into the air flowing into the member 44. Air under pressure flows from the tubular member 44 to the aforementioned control valves 70, 72, 78 and 82 through a suitable manifold line generally indicated at 88. It will be understood that the control valves shown in FIG. 3 and omitted from FIG. 4 are duplicated on the opposite side of the vehicle 40 for the purpose of controlling operation of the other drill guiding and supporting structure 42 and for controlling operation of the motor 80 associated with the wheel 50.

The vehicle 40 shown in FIGS. 3 and 4 also comprises a hydraulic fluid pressure system including a hydraulic fluid pump 89 driven by an air-operated motor 90, the operation of which is in turn controlled by an airflow control valve 91 effective to control the flow of air under pressure from the longitudinal tubular member 44 to the motor 90. The pump 89 is operative to withdraw hydraulic fluid form within the upright tubular member 45, which serves as a hydraulic fluid reservoir, through a fluid line 92 including a filter 93. From the pump 89, hydraulic fluid is supplied to control valve blocks 94 and 95 through lines 96 and 97 respectively. The valve block 94 includes a pair of hydraulic control valves 98 for controlling the flow of hydraulic fluid to hoses 99 extending to opposite ends of a double-acting hydraulic cylinder 100 suitably mounted by universal mountings 101 on the upper tubular transverse member 47 for moving a respective one of the drill guiding and supporting structures 41 and 42 rearwardly and forwardly as indicated by the double-headed arrow D relative to the vehicle 40. The aforementioned mountings 101 are of a type which permits the transverse and longitudinal positions as well as the vertical and horizontal angular positions of the drill guiding and supporting structures 41 and 42 relative to the vehicle 40 to be adjusted as desired.

The valve block 94 is shown as being mounted on a ladder 102 in turn secured at 103 on the upper tubular transverse member 47 to permit an operator to climb on the vehicle 40 for such purposes as fitting rock drills such as rock drill 43 thereon and for making any necessary adjustments to the vehicle 40.

A return line 104 extends from the valve block 94 to the upright member 45 and the latter is provided with a filler cap 105.

The valve block 95 is mounted on the longitudinally extending tubular member 44 in any appropriate manner and contains three hydraulic control valves for controlling the supply and discharge of hydraulic fluid to and from three hydraulic jacks 110, 210 and 310 respectively in accordance with this invention, the jacks 110 and 210 being suitably secured to the lower ends of the aforementioned upright members 45 and 46 respectively and the jack 310 being secured to the longitudinally extending tubular member 44 in general proximity to the rearward end thereof. The jacks 110, 210 and 310 have essentially the same structure as the jack 10 shown in FIGS. 1 and 2 of the accompanying drawings and, for this reason, it is considered unnecessary to describe the structures of the jacks 110, 210 and 310 individually in greater detail herein. The various components of the jacks 110, 210 and 310 are, however, identified in FIGS. 3 and 4 of the accompanying drawings by the same legends as used in FIGS. 1 and 2 except that such legends are prefaced by a respective one of the numbers "1," "2" and "3." It should perhaps, however, be explained that the hoses 111, 112, 211, 212 and 311 of the jacks are only partially shown for the sake of clarity.

It is also to be noted that the vehicle 40 has suitably provided thereon a level-indicating device 106 of any appropriate type, such as a bubble level, and effective to indicate when the vehicle 40 is disposed horizontally in both the longitudinal and transverse directions.

In use, the vehicle 40 is coupled to a suitable air compressor by the hose 86 and driven into its precise location for a drilling operation, usefully by operation of the aforementioned motor 80 under the control of the control valves 82. Having so been moved to such a desired location, the control valves of the valve block 95 are selectively operated to permit the flow of hydraulic fluid under pressure from the pump 89 to the upper ends of the cylinders 120, 220 and 320 of the hydraulic jacks 110, 210 and 310 respectively in turn to move the vehicle 40 into a desired level disposition as indicated by the level 106 relative to the mine floor.

The positions of the drill guiding and supporting structures 41 and 42 on the vehicle 40 are then adjusted by means of the universal mountings 101 into the desired angular, longitudinal and transverse positions. Rock drills, such as rock drill 43, are then fitted on the carriages 66 of the drill guiding and supporting structures 41 and 42.

The aforementioned control valves 78 are then actuated to move the drill steel centering devices 74 into their upright steel-engaging positions as shown in FIG. 3 and drill steels such as drill steel 73 are then inserted into each of the rock drills 43.

The control valves 72 are then operated to cause operation of the rock drills and initiation of drill holes in the roof or wall of the mine. During such operation, the control valves 70 and 98 are operated as required to advance such drill steels forwardly. As soon as the drill holes have been initiated sufficiently to make the use of the drill steel centering devices 74 unnecessary, such devices are retracted to their steel-releasing positions by operation of the control valves 78.

Further forward advance of the drill steel is then obtained by operation of the control valves 70 and 98 as will readily be understood by those skilled in the art.

When the drill holes have been completed, the drill steels 73 are withdrawn from the respective drill holes by operation of the control valves 70 and 98. The control valves of the valve block 95 are then operated to raise the ground-engaging plates 116, 216 and 316 of the jacks 110, 210 and 310 respectively from the mine floor. The control valves 82 can then be operated to actuate the motor 80 to move the vehicle 40 along the mine floor as desired distance for drilling a further set of drill holes. After such advance movement, the control valves of the valve block 95 can again be operated to lower the ground-engaging plates 116, 216 and 316 of the jacks 110, 210 and 310 respectively again to level the vehicle 40 and to permit further holes to be drilled in the mine roof or wall.

The aforementioned lower tubular transverse member 48 of the vehicle 40 is also usefully used as a water reservoir for water which is used for flushing dirt and dust from the drill holes. To this end, water is supplied to the transverse member 48 from a suitable source through a supply hose 107. Control valves 108 are provided for controlling the flow of water from the transverse member 48 through hoses 109 to rock drills such as rock drill 43 mounted on the vehicle 40, from which drills such water flows forwardly through hollow drill steels such as drill steel 73 as is conventional.

Various modifications can be made within the scope of the inventive concept disclosed. Accordingly it is intended that what is set forth herein should be regarded as illustrative of such concept and not for the purpose of limiting protection to any particular embodiment thereof, and that only such limitations should be placed upon the scope of protection to which the invention hereof is entitled, as justice dictates.

I claim:

1. A fluid-operated jack which comprises axially telescopically cooperating first and second guide members coaxially disposed about a common axis for relative axial reciprocating movement therealong, a thrust plate terminally and rigidly secured to said second guide member for conjoint movement therewith relative to said first guide member, and a double-acting fluid-operated ram pivotally connected to both said thrust plate and said first guide member, which ram includes a cylinder and a piston rod operative for relative reciprocating movement in a direction generally parallel to said common axis of said first and second guide members for causing relative movement of said first and second guide members along said common axis thereof.

2. A fluid-operated jack as defined in claim 1 in which said thrust plate has an irregular surface for engagement with a supporting surface.

3. A fluid-operated jack as defined in claim 1 in which said cylinder of said fluid-operated ram is pivotally connected to said first guide member and in which said piston rod of said fluid-operated ram is pivotally connected to said thrust plate.

4. A fluid-operated jack as defined in claim 3 in which said cylinder of said fluid-operated ram is pivotally connected to said first guide member about a first pivot axis generally perpendicular to said common axis of said first and second guide members.

5. A fluid-operated jack as defined in claim 4 in which said piston rod of said fluid-operated ram is pivotally connected to said thrust plate about a second pivot axis generally parallel to said first pivot axis.

6. A fluid-operated jack as defined in claim 1 in which said first and second guide members have corresponding polygonal cross-sectional configurations and in which said second guide member is telescopically disposed within said first guide member whereby mutual engagement of said first and second guide members resists relative rotation of said first and second guide members about said common axis thereof.

7. A fluid-operated jack as defined in claim 6 in which said first and second guide members have generally rectangular cross-sectional configurations and in which said thrust plate is secured to said second guide member so as to be substantially perpendicular to said common axis of said first and second guide members.

8. A vehicle which includes a chassis-structure; at least one outrigger secured to said chassis-structure, which outrigger in turn comprises a first guide member secured to said chassis structure of said vehicle, a second guide member coaxially disposed relative to said first guide member for cooperating telescopic movement relative thereto along a common axis of said first and second guide members, a ground-engaging thrust plate terminally and rigidly secured to said second guide member at a lower end thereof for joint movement therewith, a double-acting fluid-operated ram pivotally connected to both said thrust plate and said first guide member, which ram includes a cylinder and a piston rod operative for relative reciprocating movement in a direction generally parallel to said common axis of said first and second guide members, and means for the supply and discharge of operating fluid to and from said cylinder of said fluid-operated ram for selectively causing extension and retraction of said piston rod from within said cylinder.

9. A vehicle as defined in claim 8 in which said first and second guide members have corresponding polygonal cross-sectional configurations, and in which said second guide member is telescopically disposed within said first guide member whereby mutual engagement of said first and second guide members resists relative rotation of said first and second guide members about said common axis thereof.

10. A vehicle as defined in claim 9 in which said cylinder of said fluid-operated ram is pivotally connected to said first guide member about a first axis, in which said piston rod of said fluid-operated ram is pivotally connected to said thrust plate about a second axis, and in which said first and second axes are generally perpendicular to said common axis of said first and second guide members.

11. A vehicle as defined in claim 10 which vehicle has three said outriggers secured to said chassis structure at mutually spaced-apart positions thereon.

* * * * *